United States Patent

Matsumoto

[15] 3,675,341

[45] July 11, 1972

[54] EDUCATIONAL DEVICE

[72] Inventor: Teruo Matsumoto, Tokyo, Japan

[73] Assignee: Epoch Company, Ltd., Tokyo, Japan

[22] Filed: Sept. 17, 1970

[21] Appl. No.: 73,079

[30] Foreign Application Priority Data

March 18, 1970 Japan................................45/22811

[52] U.S. Cl..............................................................35/9 B
[51] Int. Cl. ..........................................G09b 7/02
[58] Field of Search....................................35/9 B, 9 C, 9 D

[56] References Cited

UNITED STATES PATENTS 2,943,399 7/1960 Davis........................................35/9 B
3,106,784 10/1963 Raley........................................35/9 C
3,327,405 6/1967 Ingeneri....................................35/9 B

*Primary Examiner*—Wm. H. Grieb
*Attorney*—Brufsky, Staas, Breiner and Halsey

[57] ABSTRACT

An educational device featuring a playing board possessing electrical insulation characteristics, bearing two rows of indicia to be matched by the user and provided with selected cut-out portions defining coded answer means to the matching of indicia in opposite rows, a housing adapted to receive the playing board and including individual actuating mechanisms located adjacent each indicia, a signal system and electrical circuit means within the housing energizing the signal system only as the actuating mechanisms adjacent matching indicia are operated by the user.

2 Claims, 9 Drawing Figures

PATENTED JUL 11 1972　3,675,341

INVENTOR
TERUO MATSUMOTO

BY Brufsky, Staas, Breiner & Halsey
ATTORNEYS

INVENTOR
TERUO MATSUMOTO

Brufsky, Staas,
Breiner & Halsey

BY

ATTORNEYS

INVENTOR
TERUO MATSUMOTO

EDUCATIONAL DEVICE

BACKGROUND OF THE INVENTION

The present invention relates to an educational device wherein the child attempts to match indicia, for example, apples with apples, set forth in two rows on a playing board. An infinite number of boards presenting matching problems of varying scope and complexity may be used with the same device.

Inexpensive educational and amusement devices for younger children are usually limited to a relatively small number of problems to be solved and, thus, have limited continuing educational value. More sophisticated devices retain the attention of the user but are prohibitively expensive. In contrast with the prior art, the inexpensive housing construction of the present invention is uniquely suited for use with an infinite number of playing boards bearing varying combinations of indicia designed to confront the user with continuing challenges.

SUMMARY OF THE INVENTION

The educational device of the present invention features a housing through which a plurality of actuating buttons protrude and is adapted to receive an infinite number of playing boards, each board containing two rows of indicia and cut-out portions defining a coded answer to the arrangement of indicia permitting matching of same in conjunction with a signal system capable of being energized only as actuating buttons adjacent matching indicia in opposite rows are operated by the user. The coded cut-out portions of the board are positioned between resiliently biased electrical contact points constituting an important part of the electrical circuits. The contact points are insulated from each other by the playing board except where the pre-selected cut-out portions permit engagement. The electrical circuits for energizing the signal system including the aforementioned spaced contact points are appropriately connected by switches closed by the user pushing the actuating buttons.

DESCRIPTION OF THE PREFERRED EMBODIMENT

Figure 1:
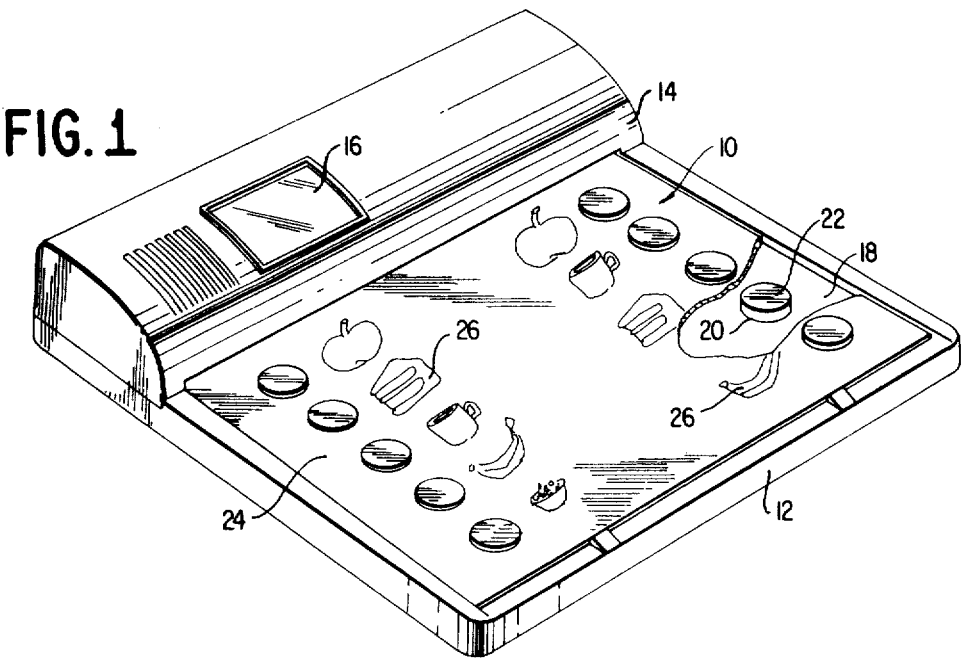
FIG. 1 is a perspective view of the educational device with a playing card positioned thereon for use.

The educational device of the present invention is designated generally by reference numeral 10 in FIG. 1 and consists generally of a base 12 within which components of the electrical system are located, a first cover 14 suitably mounted thereon, for example by screws, and provided with transparent face 16 through which a light can shine and a second cover 18 suitably mounted thereon and provided with two rows of openings 20 through which actuating buttons 22, described in detail hereinafter, protrude.

The playing board, generally designated by reference numeral 24 in FIG. 2, contains two rows of selected indicia 26 and 26' adjacent to two rows of openings 28 and is provided with coded cut-out portions 30 described in detail hereinafter. The playing board 24 is positioned in place by inserting openings 28 thereof over corresponding protruding actuating buttons 22 whereby the coded cut-out portions are positioned just inside cover 14, as illustrated in FIG. 1.

As will now be apparent, after the playing board 24 is properly inserted in place, the user attempts to match a selected indicia 26 in the left column with an appropriate indicia 26' in the right column, at which time a lamp is illuminated through the transparent cover 16 informing the user that the correct choice has been made. For example, in the playing board illustrated in FIG. 2, the lamp will be illuminated indicating correct matching of apples with apples as the top actuating button 22 in each row is depressed.

Figure 3:
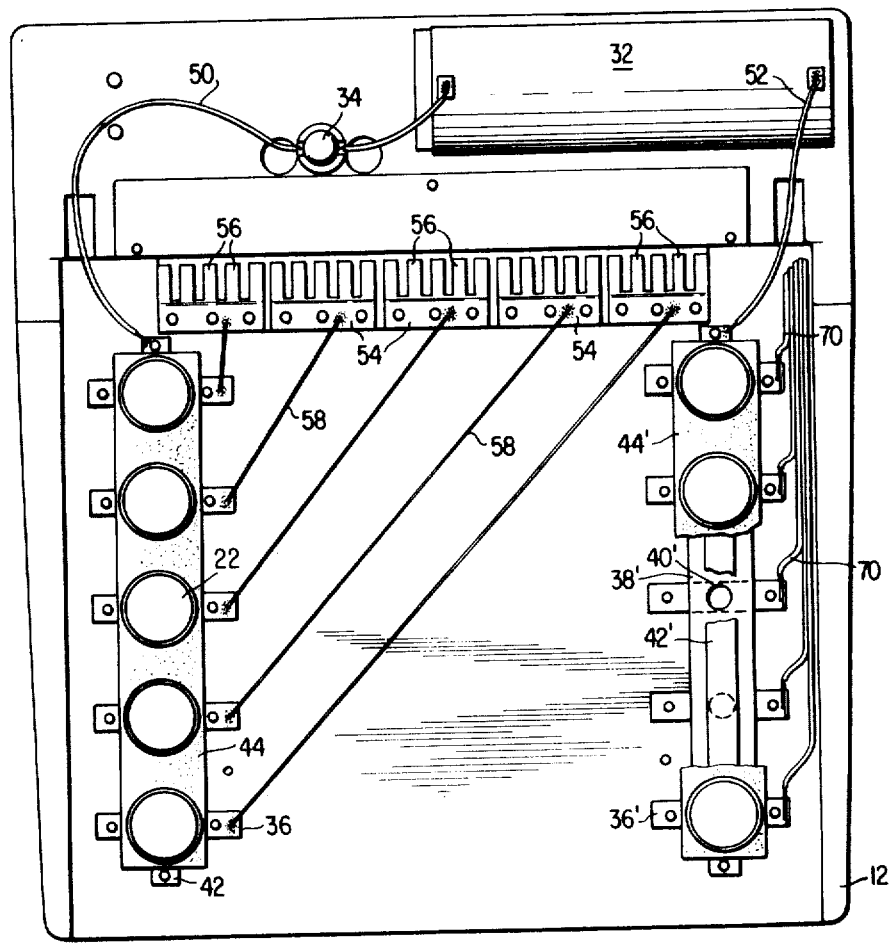
FIG. 3 is a top view of the base component of the educational device illustrating contact points and wiring.

Base 12, as illustrated in FIG. 3, includes a housing 32 within which batteries (not illustrated) are positioned and a standard lamp fixture 34 appropriately wired in series.

Figure 8:
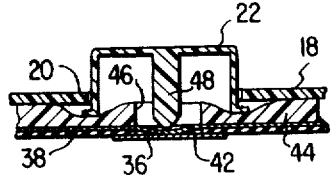
FIG. 8 is a cross-sectional view illustrating electrical contact between conducting plates as an actuating button is depressed.
Figure 7:
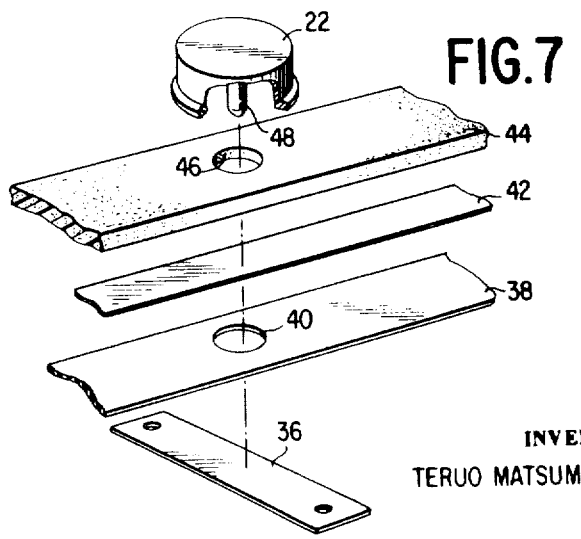
FIG. 7 is an exploded perspective view illustrating one of the actuating buttons and its relationship to the electrically conducting plates and insulating medium located within the base component of the educational device.

Within the bottom of base 12 are located two rows of electrically conducting plates 36 and 36', each plate being provided with openings through which pegs, molded as a part of base 12, extend. The openings and pegs will not be described in detail as they are conventional and function merely to secure plates 36 and 36' to the base 12. Across each row of plates 36 and 36' extend insulating plates 38 and 38' provided with openings at each end through which pegs extend formed as a part of the base. Each of the insulating plates 38 and 38' includes a series of openings 40 and 40', respectively, at the juncture of conducting plates 36 and 36'. On top of insulating plates 38 and 38' are located electrically conducting plates 42 and 42'. Finally, resilient strips 44 and 44' containing openings 46 and 46' are positioned on top of conducting plates 42 and 42'. The actuating buttons 22 each include a point 48 formed as an integral part thereof and are positioned at the points of juncture of the conducting plates 36, 36' and 42, 42' and the insulating plates and strips 38, 38' and 44, 44', each point 48 passing through openings 46 and 46' in the strips 44, 44'. As will now be apparent, and as illustrated in FIGS. 7-8, normally conducting plates 36, 36' and 42, 42' are held in spaced relationship by insulated plates 38, 38'. However, as a button 22 is depressed, as illustrated in FIG. 8, the point 48 thereof forces the uppermost conducting plate 42 downwardly through the opening 40 of the insulating plate 38 into contact and electrical engagement with the lowermost conducting plate 36. Conducting plate 42 is electrically connected to lamp 34 through wire 50 while conducting plate 42' is electrically connected to the battery housing 32 by wire 52.

Figure 4:
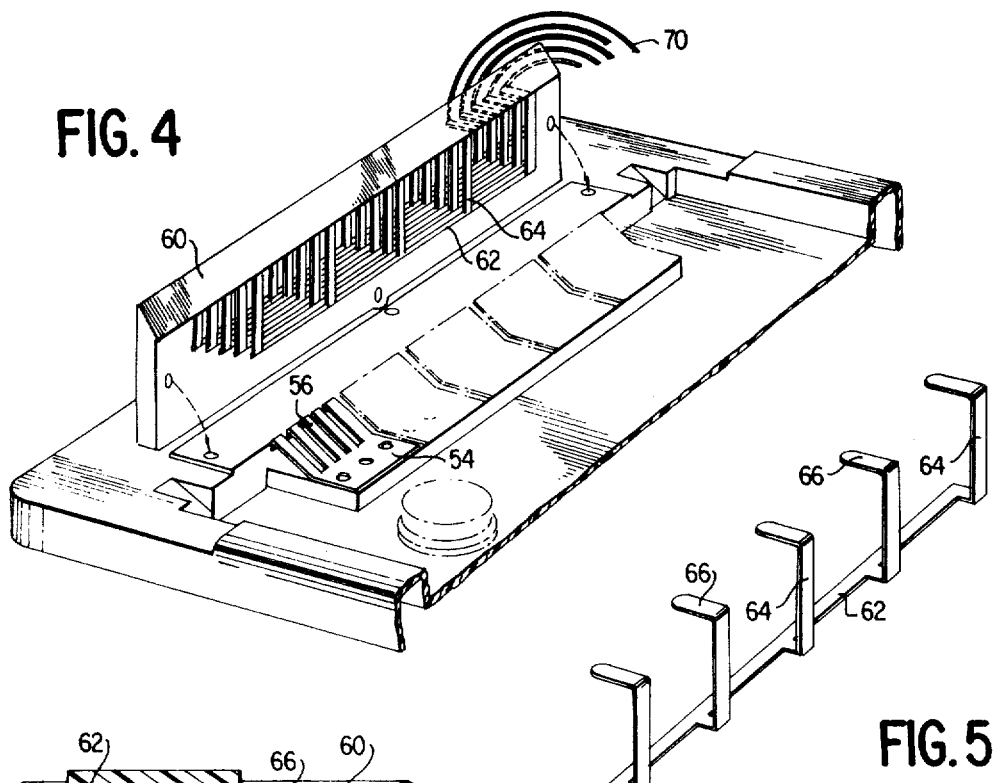
FIG. 4 is a perspective view of a portion of the base component of the educational device and a wiring panel rotated 90° counter clockwise from its position of use to illustrate its conductor strips.

Also mounted within base 12 are five segmented electrical contacts 54 each containing five prongs or points 56 bent upwardly, as illustrated in FIG. 4. Contacts 54 are connected to conducting plates 36 through wiring 58, as illustrated in FIG. 3.

Figure 5:
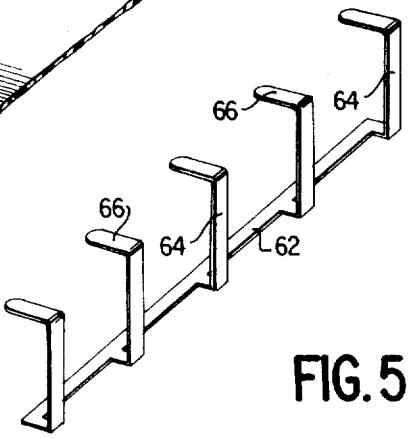
FIG. 5 is a perspective view of one of the five conductor strips located within the wiring panel.
Figure 6:
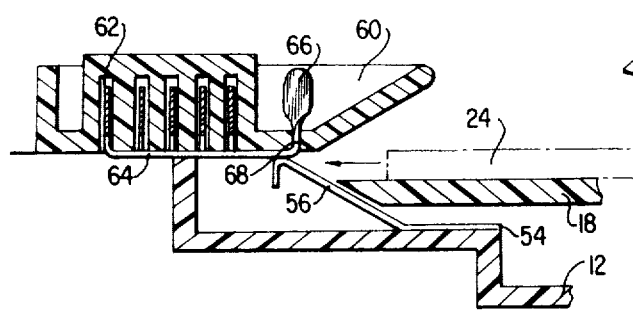
FIG 6 is a cross-sectional view of a portion of the base component of the educational device and the wiring panel positioned for use, illustrating insertion of the top segment of the playing board whereby electrical contact may be established between selected resiliently biased points formed as a part of the base component and wiring panel.

The panel 60, illustrated in FIG. 4, contains five electrical contacts 62 each including five points 64, as illustrated in detail in FIG. 5. The terminal end 66 of each point 64 is bent and passes through slots 68 located within the panel 60 after which it is twisted, as illustrated in FIG. 6. The five twisted points 66 on the right hand side of the panel, as illustrated in FIG. 4, are electrically connected to the conducting plates 36', as illustrated in FIG. 3, by wires 70.

Figure 2:
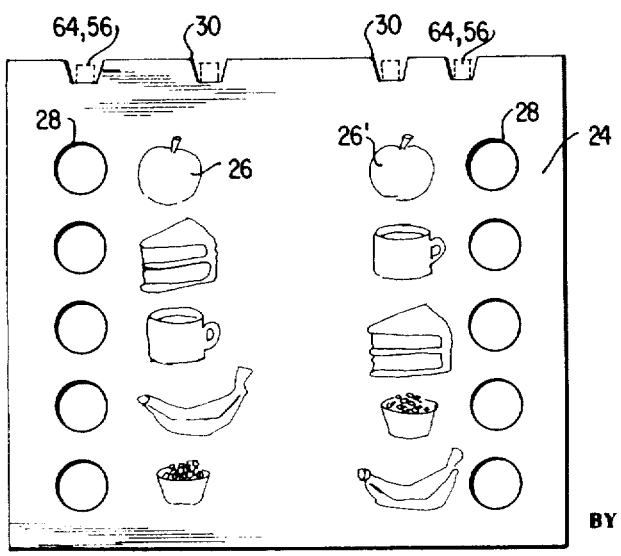
FIG. 2 is a top view of one playing card featuring two rows of indicia to be matched by the user.

As illustrated in FIGS. 2 and 6, when the playing board 24 is inserted in place, predetermined selected electrical contact is made between the points 56 of contacts 54 and the points 64 of contacts 62 through coded cutout portions 30 of the playing board 24. Where no coded cut-out portion exists, the top of the playing board 24 insulates points 56 and 64 breaking circuits. The position of coded cut-out portions 30 along the top of the board 24 is determined by the position of the indicia 26, 26' on the board 24 such that when one of the buttons 22 in the left hand column corresponding to a particular indicia is pressed and a button 22 in the right hand column adjacent the matching indicia is pressed, a circuit is completed and the lamp 34 illuminated through window 16 informing the user that a correct selection has been made.

Figure 9:
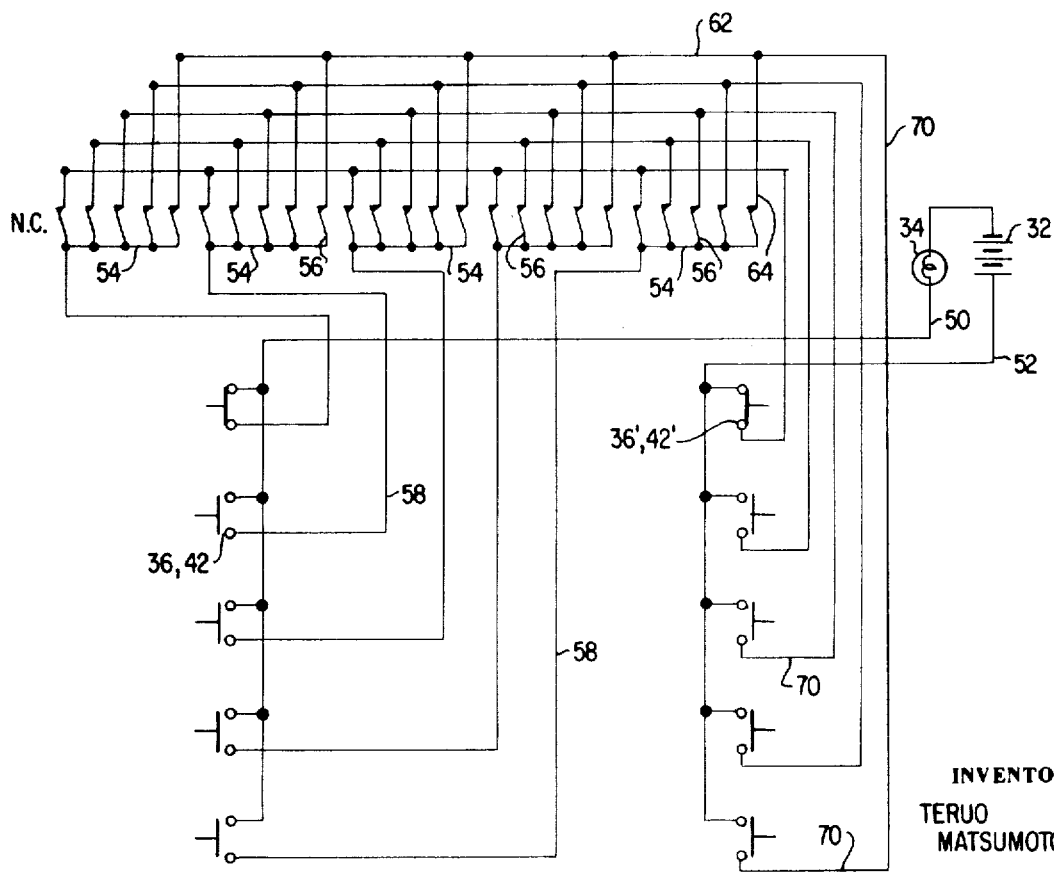
FIG. 9 is a wiring diagram of the educational device, illustrating in heavy lines establishment of a circuit causing illumination of a signal lamp as the top two buttons are correctly pressed to indicate matching of apples of the playing board illustrated in FIG. 2.

In FIG. 9 is illustrated the wiring diagram of the educational device. For purposes of clarity, that portion of the entire circuit activated when the top buttons 28 in the left and right hand columns are pushed to match the apples illustrated on the sample playing board illustrated in FIG. 2 is shown in heavy lines. As will be apparent, if the user presses the uppermost left hand button designating an apple, the circuit cannot be completed unless the uppermost right hand button designating a matching apple is pressed. In like manner, if the user presses the second button from the top in the left hand column designating a piece of cake, the circuit can only be completed if the third button from the top in the right hand column designating a piece of cake is pushed.

As will be apparent, numerous playing boards having a variety of indicia are used with the present invention.

I claim:

1. An educational device, comprising:
   a. a board bearing two rows of indicia and provided with means defining a coded answer to the arrangement of indicia permitting matching of same and including selected cut-out portions, said board further including an electrically insulating medium; and
   b. a housing adapted to receive said board including
      i. a plurality of actuating mechanisms adjacent said indicia,
      ii. signal means, and
      iii. means acting in conjunction with said means defining a coded answer to energize said signal means only as actuating mechanisms adjacent matching indicia in opposite rows are operated by the user including a first series of segmented electrical contacts, each of said contacts containing a plurality of first contact points, a second series of continuous electrical contacts, each of said contacts including a plurality of second contact points, means biasing said first and second points in resilient contact with each other such that when said board is positioned therebetween electrical contact between said first and second points is limited to those of said first and second contact points located within said coded cut-out portions of said board.

2. An educational device as in claim 1, wherein
   B. said means acting in conjunction with said means defining a coded answer to energize said signal means further including two rows of first electrical conducting plates mounted within said housing adjacent said actuating mechanisms, means electrically connecting those of said first conducting plates in one row to said first series of segmented electrical contacts and connecting the remainder of said first conducting plates in the other row to said second series of continuous electrical contacts, insulating strips positioned transversely of each row of said first conducting plates and provided with openings adjacent said first conducting plates, second electrical conducting plates positioned adjacent said insulating strips permitting contact between said first and second conducting plates as said actuating mechanisms force said first conducting plates through said openings of said insulating strips into engagement with said first conducting plates and means electrically connecting said first and second conducting plates to said signal means.

* * * * *